United States Patent [19]

Baltzell et al.

[11] Patent Number: 4,764,070
[45] Date of Patent: Aug. 16, 1988

[54] CAPPED WHEEL NUT ASSEMBLY

[75] Inventors: William L. Baltzell, Riverview; David J. Draeger, Woodhaven, both of Mich.

[73] Assignee: Horizons Unlimited, Inc., Romulus, Mich.

[21] Appl. No.: 15,427

[22] Filed: Feb. 17, 1987

[51] Int. Cl.$^4$ .......................................... F16B 37/14
[52] U.S. Cl. .................... 411/430; 411/372; 411/375; 411/900
[58] Field of Search ............... 411/429, 430, 371–377, 411/69, 900, 901, 82, 258; 106/18.12

[56] References Cited

U.S. PATENT DOCUMENTS

| | | | |
|---|---|---|---|
| 1,691,923 | 11/1928 | Eklund | 411/82 X |
| 2,008,047 | 7/1935 | Stangl | 411/373 X |
| 2,018,301 | 10/1935 | Perry | 411/430 |
| 2,283,123 | 5/1942 | Osborne | 411/373 X |
| 3,298,272 | 1/1967 | Henderson | 411/373 |
| 3,364,806 | 1/1968 | Chaivre | 411/430 |
| 4,275,285 | 6/1981 | Jadach | 411/430 X |
| 4,460,300 | 7/1984 | Bettini et al. | 411/430 X |
| 4,521,250 | 6/1985 | Kuzel et al. | 106/18.12 X |
| 4,669,937 | 6/1987 | Feldman | 411/376 X |

FOREIGN PATENT DOCUMENTS 21572 12/1946 Finland ................. 411/429

Primary Examiner—Lloyd A. Gall
Attorney, Agent, or Firm—Barnes, Kisselle, Raisch, Choate, Whittemore & Hulbert

[57] ABSTRACT

A capped wheel nut assembly in which a cap sleeved over the nut is secured to the nut by an adhesive. The adhesive has sufficient flexibility to eliminate rattle and preferably is a silicon adhesive. The cap has an enlarged marginal portion at the open end crimped over a circular enlargement on the nut.

4 Claims, 1 Drawing Sheet

CAPPED WHEEL NUT ASSEMBLY

This invention relates generally to a wheel nut assembly and refers more particularly to a capped wheel nut assembly for automobile wheels.

BACKGROUND AND SUMMARY OF THE INVENTION

The capped wheel nut assembly of the present invention is designed to replace the construction presently in use in which the cap is welded to the nut. According to the present invention, the cap is secured to the nut by adhesive.

Usually in a capped wheel nut assembly, the nut is steel with a zinc plate and the cap is stainless steel. A welded joint between the nut and cap is a corrosive site because of the different metals involved. Elimination of the welded joint eliminates these corrosive sites which lead to weakening or failure of the bond. Elimination of the welded joint also eliminates stress risers in the cap which are caused by the welding of the cap to the nut.

The adhesive bond of the present invention insulates the two metals from each other and thus resists corrosion.

The adhesive bond also imparts flexibility and thus eliminates rattle.

It has been found that an adhesive bond also produces a much lower on/off failure rate, that is, the capped wheel nut assembly may be applied and removed from a bolt many more times than a welded nut before failure.

The adhesive employed in the present invention is one which retains its adhesive character over a wide range of temperatures, preferably a silicon adhesive.

Not only will a welded capped wheel nut assembly corrode, but often the weld sites will show through. Thus an adhesive bond will improve the appearance of the wheel nut assembly because of the elimination of the weld and of the distortion due to high pressures associated with a welding operation.

As another feature of the invention, the open end of the cap has an enlarged marginal portion that is crimped over a circular enlargement near one end of the nut. This improves axial retention which is important because there is a tendency for an impact wrench to ride up and pull the cap off the nut. The crimp also reduces stress concentration. Stress at the open end of the cap can sometimes cause the cap to split.

Other advantages and features of the invention will become more apparent as the following description proceeds, especially when considered with the accompanying drawings.

DETAILED DESCRIPTION

Figure 1:
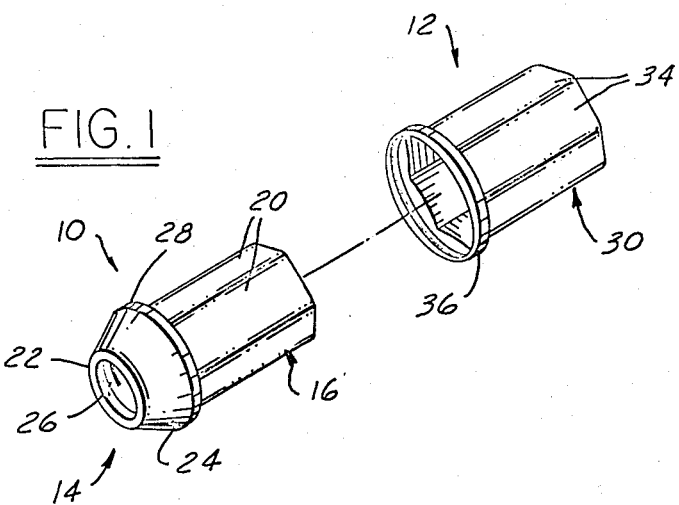
FIG. 1 is an exploded view of a capped wheel nut assembly constructed in accordance with the invention, in which the wheel nut and cap are shown separated.
Figure 2:
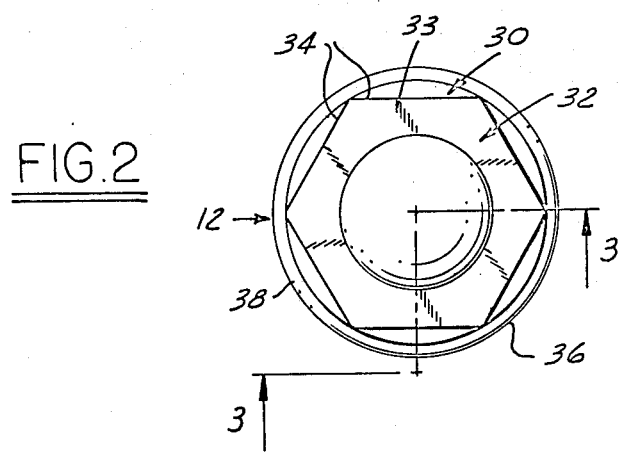
FIG. 2 is a top plan view of the capped wheel nut assembly.

Referring now more particularly to the drawings, the capped wheel nut assembly comprises a wheel nut 10 and a cap 12.

The wheel nut 10 is in the form of an elongated tubular body 14. The body 14 has a main body portion 16 extending from the end 18 throughout a major portion of its length. The main body portion 16 has a polygonal side wall. More specifically, it is in the form of a six sided regular polyhedron in which all six outer surfaces or flats 20 are identical and in which the angles between adjacent flats 20 are all equal. The flats 20 extend parallel to the longitudinal center line of the tubular body.

The nut body 14 is tapered at the nose end 22 to provide a frusto-conical seat 24 adapted to engage a complementary seating surface around a bolt on which the nut is threaded. The nut is interiorly threaded where indicated at 26 from its nose end 22 part way towards the opposite end of the nut body.

The nut body 14 has a circular enlargement 28 between the seat 24 and the main body portion 16, providing a radially outwardly extending circular abutment surface or shelf 29 where the main body portion 16 meets the enlargement 28. The large end of the frusto-conical seat 24 merges into the circular enlargement 28.

The cap 12 has an elongated side wall 30 and an end wall 32 closing one end of the cap. The opposite end of the cap is open. The end wall 32 has a marginal portion 33 which is at right angles to the longitudinal centerline of the cap, and an outwardly domed central portion.

The side wall 30 of the cap is polygonal. More specifically, it is in the form of a regular six sided polyhedron in which all six surfaces or flats 34 are identical and parallel to the longitudinal centerline of the side wall 30 and in which the angles separating the six flats are all equal. The inside dimensions of the side wall 30 are slightly larger than the outside dimensions of the main body portion 16 of the nut.

The side wall 30 of the cap at the open end terminates in an outwardly flared circular marginal portion 36 which has a radial outwardly extending flange 38 and a terminal cylindrical portion 40 concentric with the longitudinal centerline of the side wall.

Figure 3:
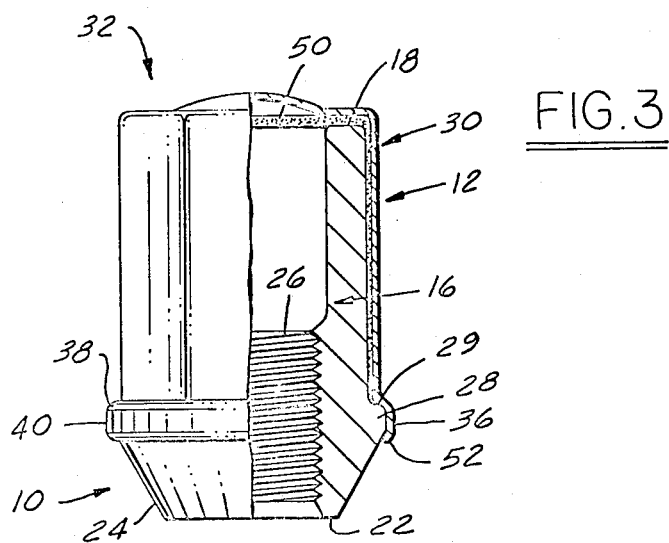
FIG. 3 is a side elevational view with parts in section, the section being taken along the line 3—3 in FIG. 2.

The cap is assembled on the nut by sleeving it over the main body portion 16 to the point where the flange 38 of the marginal portion 36 of the side wall 30 of the cap engages the abutment surface 29 on the nut throughout a full 360°, substantially as shown in FIG. 3. The marginal portion 36 of the cap encircles the enlargement 28 of the nut with the cylindrical portion 40 thereof contacting the radially outer surface of the enlargement 28 throughout a full 360°. The cap is, of course, turned about its axis before assembly so that when assembled the flats and angles on the side wall 30 of the cap are aligned with and confront the flats and angles on the main body portion 16 of the nut. The flats of the nut and cap are laterally or radially spaced from one another, and the marginal portion 33 of the end wall 32 of the cap is axially spaced from the annular end 18 of the nut. These spaces are completely filled with or occupied by adhesive 50. In other words, adhesive 50 completely coats all of the flats 20 and 34 of the nut and cap to uniformly separate or space them apart, and completely coats the annular end 18 of the nut and marginal end portion 33 of the cap to uniformly separate or space them apart. The adhesive 50 may be applied to the surfaces of the nut and cap before assembling them together.

The adhesive 50 is preferably a silicon adhesive and is of a nature such that it will retain its adhesive character over a temperature range of about −60° F. to 470° F.

To complete the assembly, the outer edge portion 52 of the cylindrical portion 40 of the marginal portion 36 of the cap is mechanically crimped over the enlargement 28 so as to press inward and bear against the frusto-conical seat 24 at the nose end of the nut.

After the adhesive has set, it provides a highly effective bond between the parts with sufficient inherent flexibility to eliminate rattle.

The bond also insulates the two metals from each other and thus resists corrosion.

The adhesive provides an effective bond even at extremely high and low temperatures.

The mechanical clinching of the parts together by crimping of the outer edge portion 52 of the marginal portion of the cap over the enlargement 28 on the nut improves axial retention and reduces stress concentration.

We claim:

1. A capped wheel nut assembly comprising a metal nut and a metal cap, said nut having an elongated internally threaded body provided with a polygonal side wall extending from one end thereof toward the opposite end, said cap having an elongated annular side wall of substantially the same polygonal form as the side wall of said nut body, said cap having an end wall closing one end thereof and being open at the opposite end, said cap being sleeved over said nut body with its side wall surrounding the side wall of said nut body and with its end wall overlying said one end of said nut body, said nut body having a circular enlargement adjacent to but spaced from the end opposite said one end thereof, the side wall of said cap having an outwardly flared marginal portion at its open end crimped over said enlargement, and an adhesive bonding said nut and cap together, said adhesive being capable of retaining its adhesive character over a wide range of temperatures, said adhesive completely covering the confronting surfaces of said nut and cap in the bonded area to thereby provide a barrier separating and insulating such confronting surfaces from each other to resist corrosion.

2. A capped wheel nut assembly as defined in claim 1, wherein said nut body has a tapered portion extending from said enlargement to said opposite end thereof, said crimped marginal portion of said side wall of said cap extending along and gripping said tapered portion.

3. A capped wheel nut assembly as defined in claim 2, wherein said adhesive retains its adhesive character within a temperature range of about $-60°$ F. to $470°$ F.

4. A capped wheel nut assembly as defined in claim 3, wherein said adhesive is a silicon adhesive.

* * * * *